United States Patent

[11] 3,526,215

| [72] | Inventor | Frank Metcalf Aspin<br>Bexton, Knutsford, Cheshire, England |
|---|---|---|
| [21] | Appl. No. | 720,167 |
| [22] | Filed | April 10, 1968 |
| [45] | Patented | Sept. 1, 1970 |
| [32] | Priority | April 13, 1967 |
| [33] | | Great Britain |
| [31] | | 16,948/67 |

[54] ROTARY VALVES FOR INTERNAL COMBUSTION ENGINES
3 Claims, 31 Drawing Figs.

[52] U.S. Cl.......................................... 123/190, 123/80
[51] Int. Cl.......................................... F01l 7/00, F01l 7/08
[50] Field of Search.......................................... 123/190D, 190, 80B, 80D, 80

[56] References Cited
UNITED STATES PATENTS

| 983,328 | 2/1911 | Vallillee | 123/190(D)UX |
|---|---|---|---|
| 1,098,679 | 6/1914 | Mueller et al. | 123/190(D)UX |
| 1,159,482 | 11/1915 | English | 123/190(D)UX |
| 1,238,559 | 8/1917 | Ofeldt | 123/190(D)UX |
| 1,539,041 | 5/1925 | Crawford | 123/190(D)UX |
| 2,216,057 | 9/1940 | Tipton | 123/190(D)UX |
| 2,457,206 | 12/1948 | Carlson | 123/190(D)X |
| 2,926,640 | 3/1960 | Aspin | 123/190(D)X |
| 3,133,530 | 5/1964 | Goodheim | 123/190(D)X |

FOREIGN PATENTS

| 543,227 | 2/1942 | Great Britain | 123/190(D)UX |

*Primary Examiner*—Wendell E. Burns
*Attorney*—Bierman and Bierman

ABSTRACT: A rotary valve for an internal combustion engine having a rotor with driving means therefor, which means has a conical sealing face complementary to a corresponding face in a housing. The base end of the rotor is exposed to gas pressure in the cylinder and has a combustion space open permanently to the cylinder through the base end of the rotor and to at least one port at the conical sealing face. The combustion space constitutes most of the combustion volume at maximum compression and also constitutes a passage for the combustion gases. The conical sealing face in the housing has at least one inlet and one exhaust port complementary to that in the rotor and means is provided for driving the rotor in order to provide cyclic variation of rotational speed with phases of increased and reduced speed of rotation wherein the reduced speed phase occurs during the combustion pressure axial loading of the rotor and the rotor is set for minimum velocity movement at substantially the point of maximum cylinder pressure.

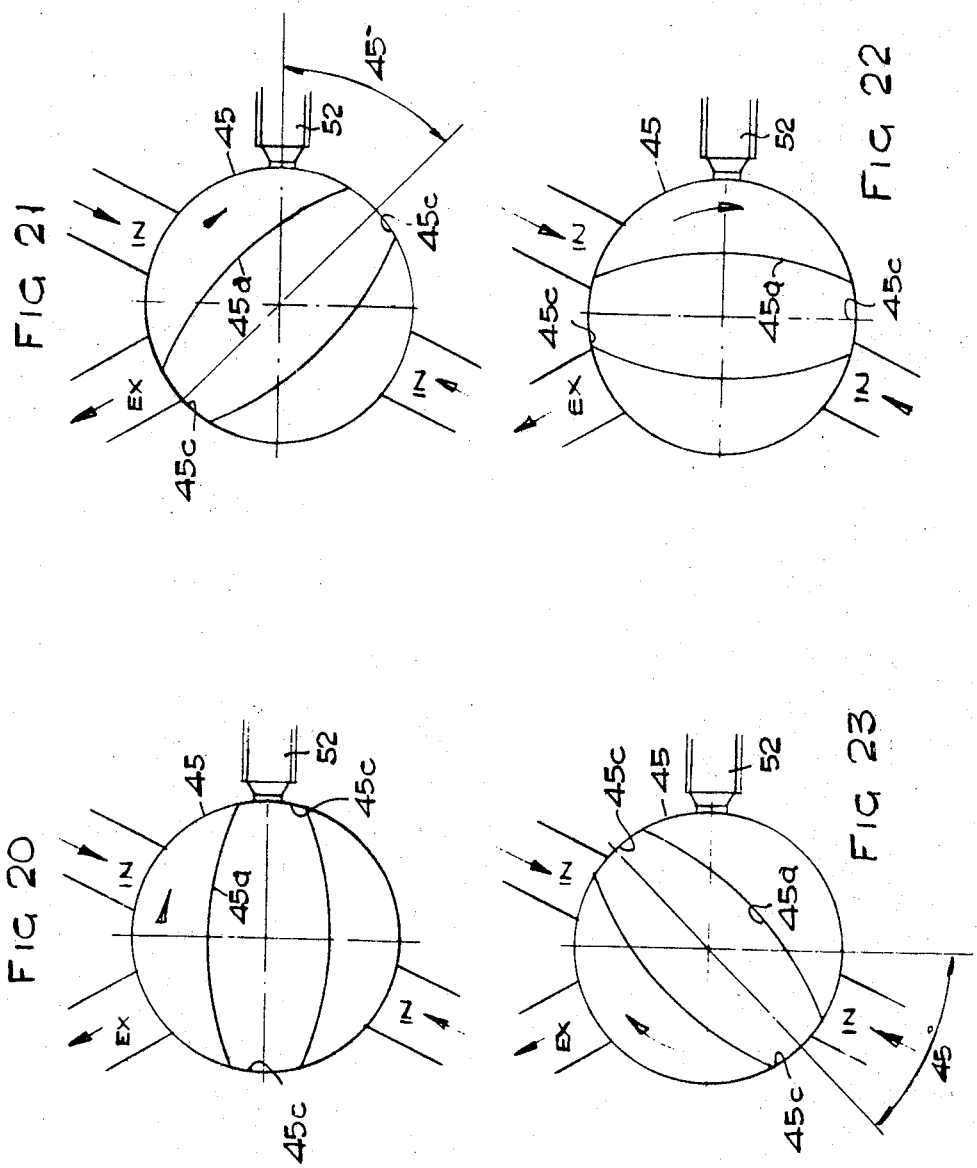

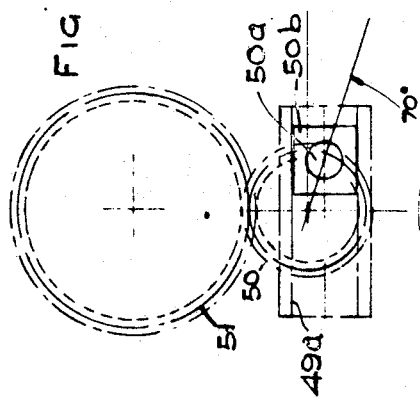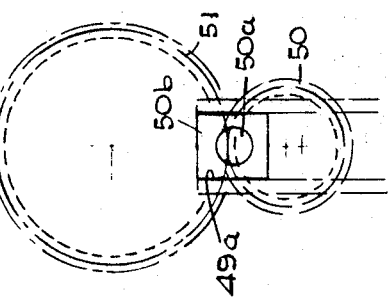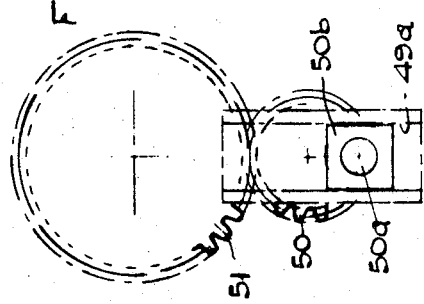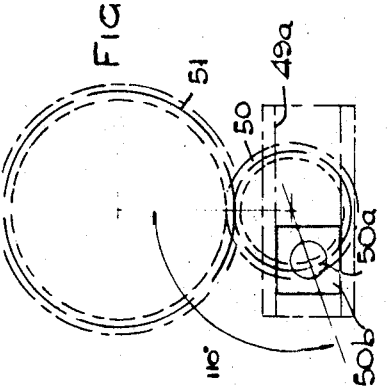

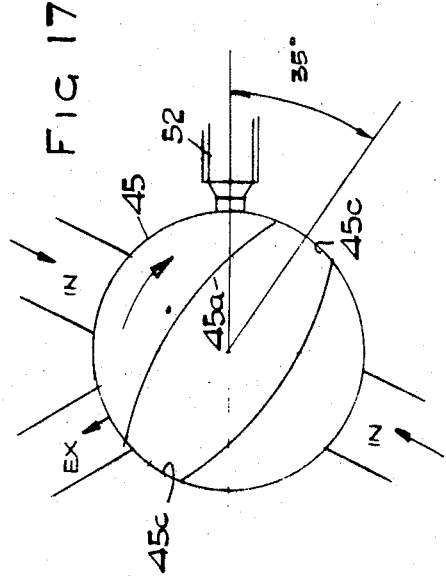
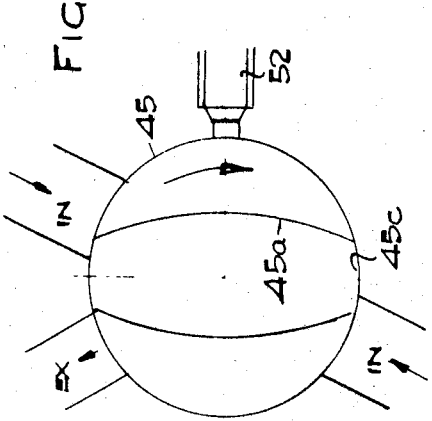
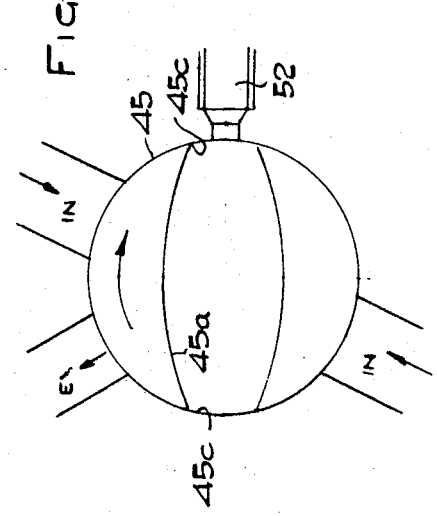
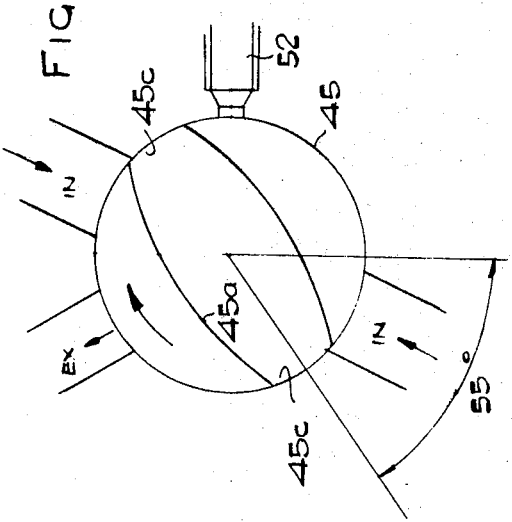

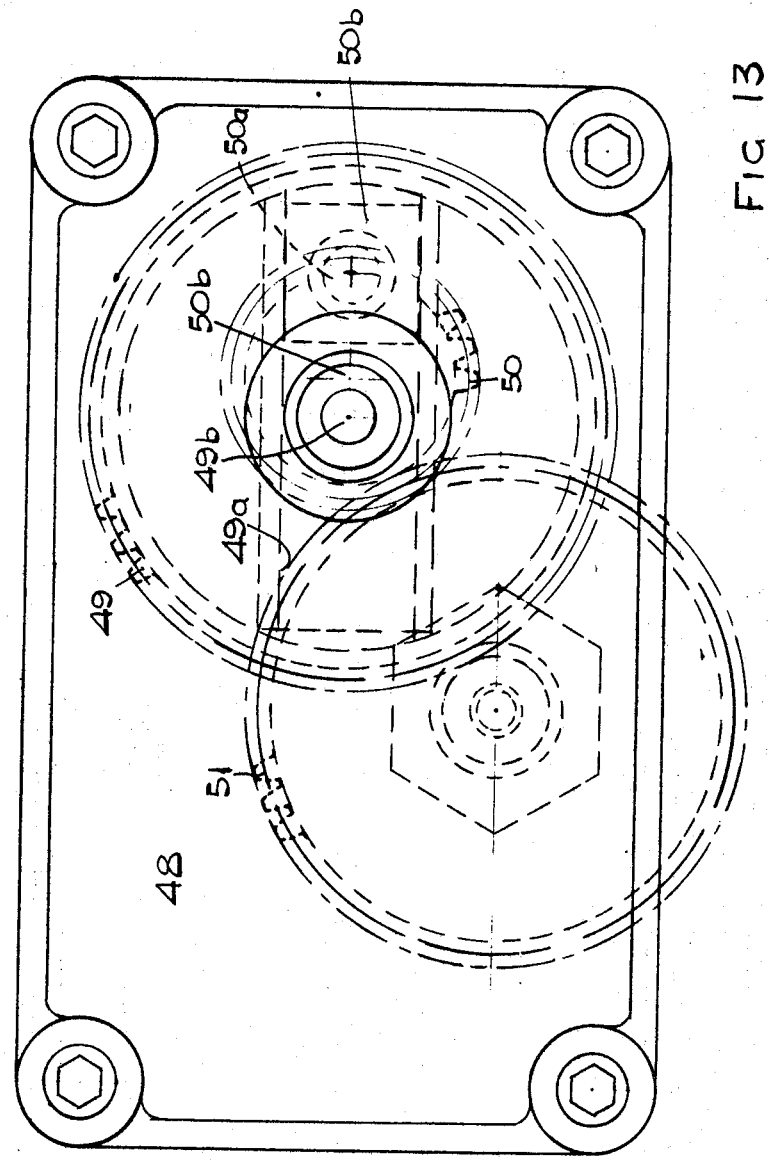

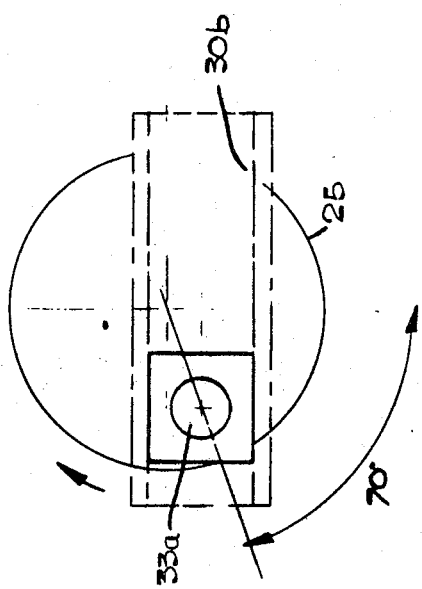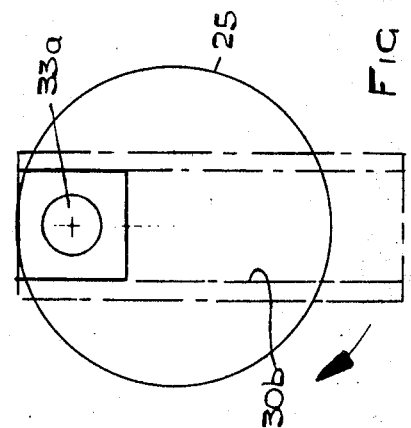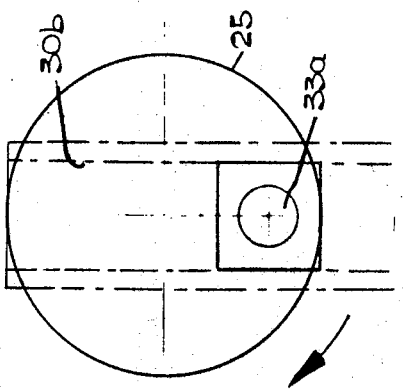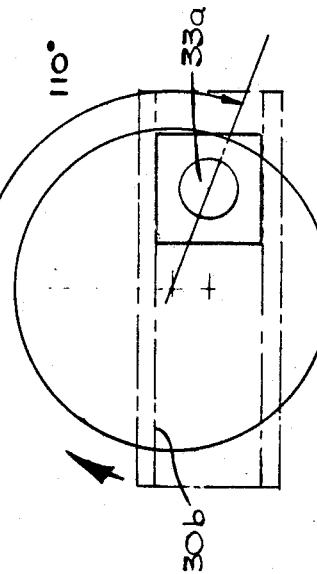

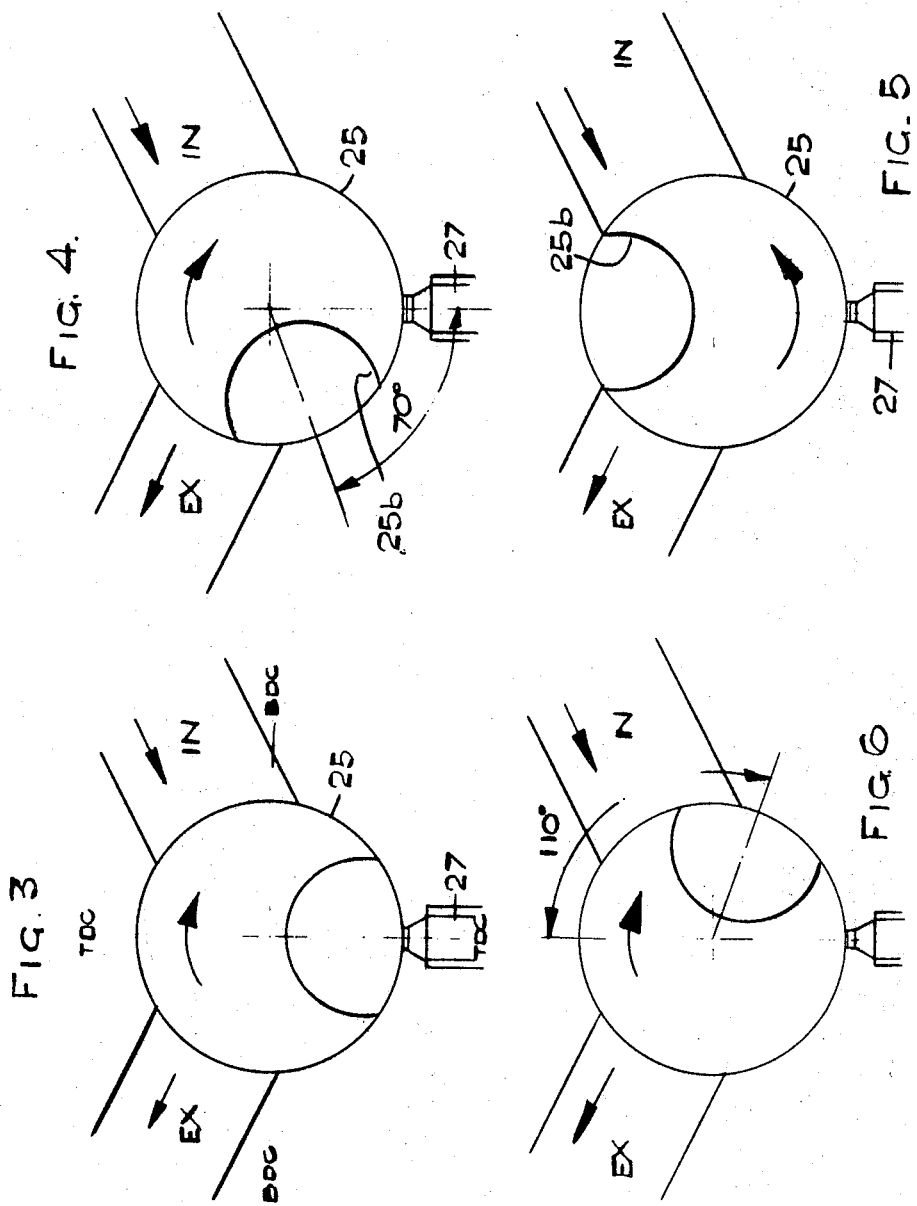

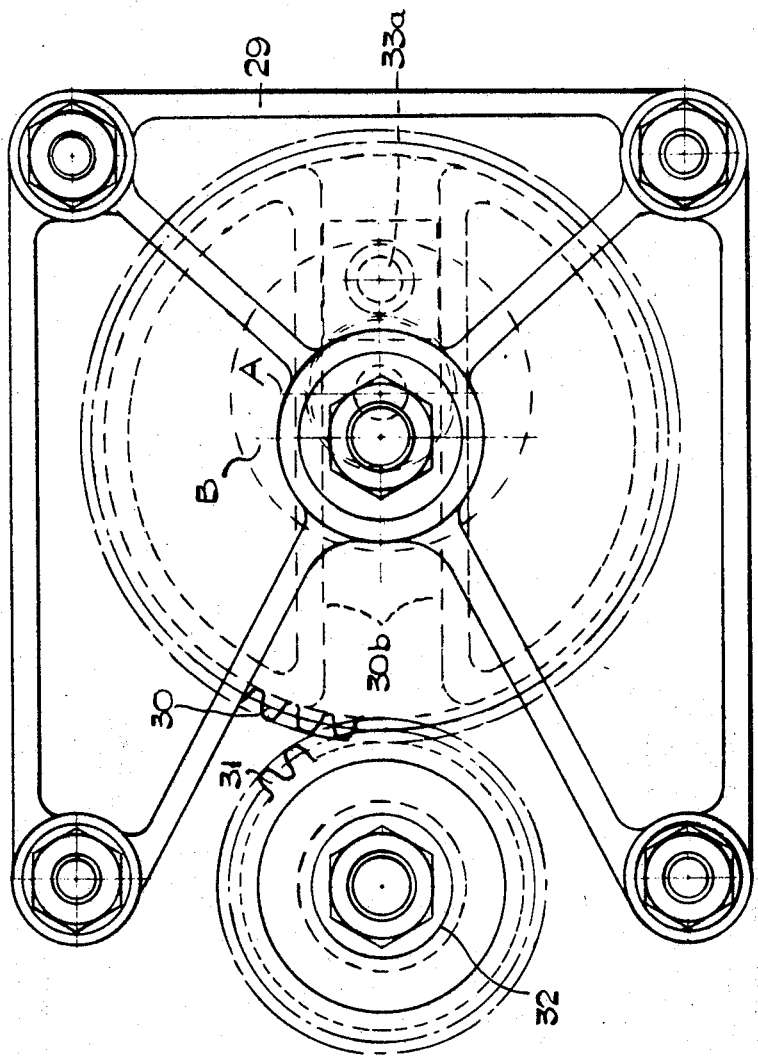

3,526,215

1

ROTARY VALVES FOR INTERNAL COMBUSTION ENGINES

This invention relates to rotary valves for internal combustion engines, of the kind hereinafter termed the kind referred to, in which the body of the valve is conical and rotates in a complementary conical seating, and is formed with a combustion space open permanently to the cylinder and to at least one port in the conical face of the valve, said space constituting the major portion of the combustion volume at maximum compression, the said space also acting as a passage for combustion gases. The first known valve of the kind aforesaid is described and illustrated in British Pat. No. 463,412.

There are several problems associated with a valve of the kind aforesaid.

One such problem is the mechanical power loss which is a function of the turning effort applied to the rotary valve, which in turn is a function of the loading of the complementary conical surfaces, and of the relative surface speed thereat. Clearly such conical surfaces have to be loaded sufficiently to provide a gas seal but with the modern trend towards the "square" and "oversquare" engine design, i.e., where the piston stroke is respectively equal to or less than the cylinder diameter, such problem is aggravated by increase in valve diameter for a given cylinder volume since such increase of diameter involves both increase of load and increase of distance of the loaded surface from the axis of rotation, both of which increase the turning effort required.

To meet this problem it has been proposed by various means for contra-loading the valve axially, to reduce the loading on the said complementary conical surfaces, with resultant reduction in turning effort absorbed by the valve and consequently appreciable improvement in mechanical efficiency. However, such contra-loading must at all times leave an effective sealing loading of such surfaces and therefore, to be efficient, should vary with the variation of axial loading by gaseous pressure throughout the engine cycle. Such varying contra-loading which must be correctly phased with such gaseous pressures, is not easy to achieve, especially at high engine speeds, and the necessity to have an effective factor of safety against separation of such surfaces has seriously limited the extent and use of contra-loading.

While such solution of the said problem i.e. contra-loading has achieved some degree of reduction of frictional power loss at the conical valve surfaces, the present invention is based on the fuller appreciation that such power loss is not only a function of the load but also of the angular movement of the valve while loaded, the energy absorbed being the mathematical product of force and distance.

The object of the present invention, while dealing with the same problem is to provide a novel construction of rotary valve of the kind referred to, so as to reduce frictional power loss by a new approach to such problem arising from the aforesaid appreciation.

Another problem associated with all rotary valves is the factor of "timing overlap," it being an established principle that such overlap is an advantage in all types of engine valve gear in order to obtain earlier effective opening of the inlet and thereby increase the effective volume of the combustion charge. Such "timing overlap," i.e., opening of the inlet before the exhaust has been closed, has well known disadvantages as regards the resultant low engine power and other undesirable characteristics at low speeds.

Another object of the present invention is to enable the available port areas in the valve and housing to be effectively enlarged in size relative to the angular movement of the engine crankshaft and without reference necessarily to timing overlap, or to enable a combination of an effectively enlarged port area with some degree of overlap without the same degree of prejudice to the engine characteristics as has previously been obtained.

According to the present invention a rotary valve for an internal combustion engine comprises a rotor with means for driving the same, said rotor having a conical sealing face complementary to a conical sealing face in a housing, the base end of the rotor being exposed to gaseous pressure in the cylinder, said rotor being formed with a combustion space open permanently to the cylinder through the said base end of the rotor and to at least one port at the said conical sealing face, said combustion space constituting the major portion of the combustion volume at maximum compression and also constituting a passage for combustion gases, characterised in that the means for driving the rotor is constructed to provide cyclic variation of rotational speed with reduced speed of rotation during combustion pressure loading of the base end of the rotor.

In the accompanying drawings:

FIG. 2 is a plan of the gear drive shown in FIG. 1;

FIGS. 3, 4, 5 and 6 are diagrammatic plan views showing the port in the rotor and the complementary inlet and exhaust ports in their relative size and consecutive positions throughout the four cycles of a 4-stroke engine at 180 degrees crankshaft movement intervals starting from top dead center firing;

FIGS. 3A, 4A, 5A and 6A are similar plan views showing the relative positions of the crank pin and slide of FIGS. 1 and 2;

FIG. 13 is a plan of the rotor driving mechanism shown in FIG. 12;

Figure 14:
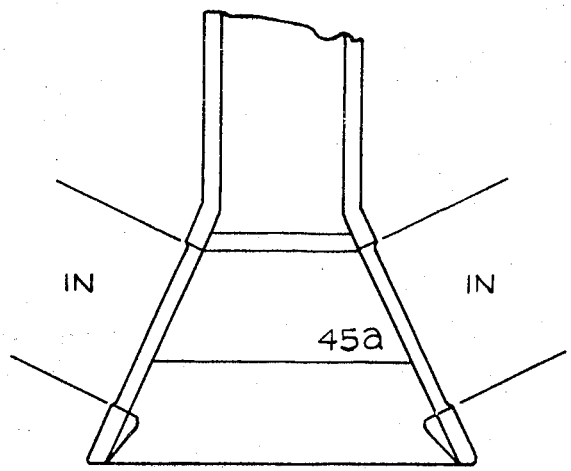
FIG. 14 is a sectional elevation of the valve rotor shown in FIGS. 12 and 13.
Figure 12:
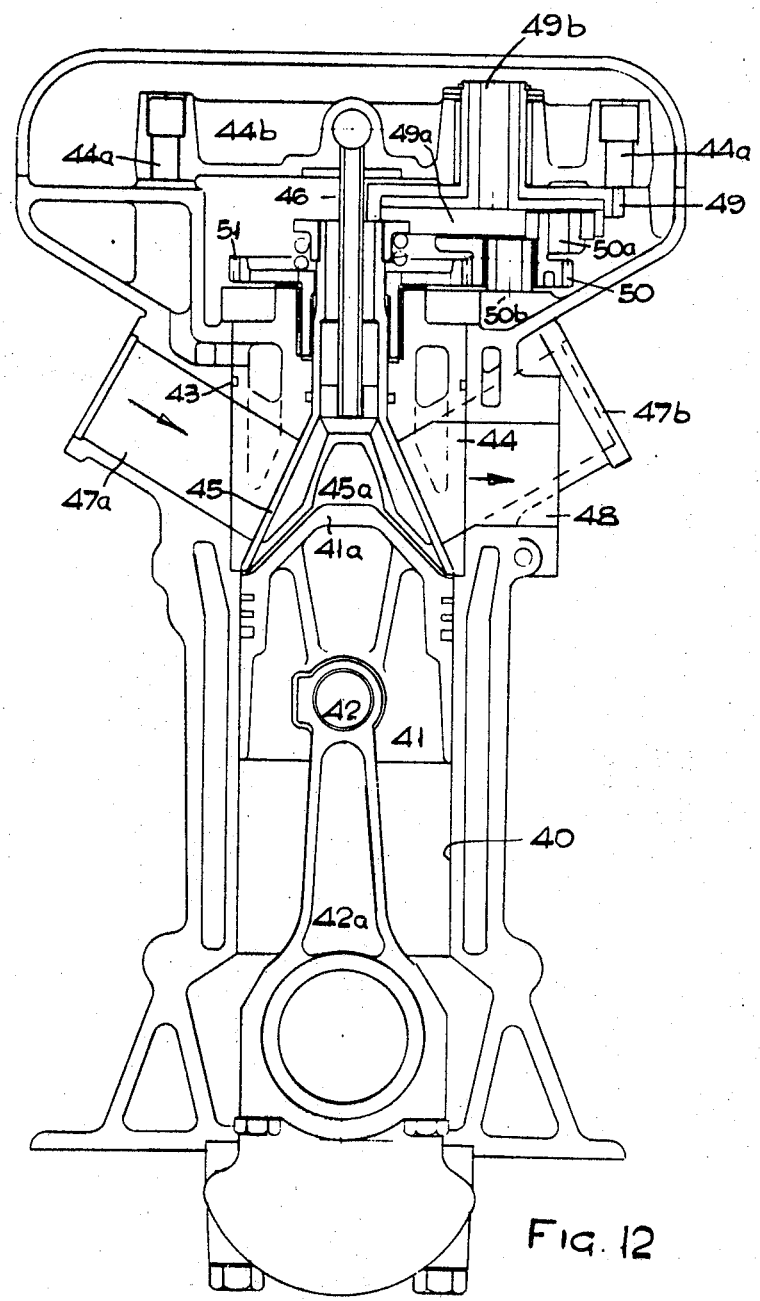
FIG. 12 is a sectional elevation of the cylinder head and valve rotor of another construction made in accordance with the present invention in which the valve rotor makes one complete turn for every four complete turns of the engine crankshaft.

FIGS. 16, 17, 18, and 19 are plan views similar to FIGS. 3, 4, 5 and 7 above but with the rotor of FIG. 14;

FIGS. 16A, 17A, 18A and 19A are plan views similar to FIGS. 16, 17, 18 and 19 respectively showing the relative positions of the crank pin and slide of FIGS. 12 and 13; and FIGS. 20, 21, 22 and 23 are diagrammatic plan views similar to FIGS. 16, 17, 18 and 19 above but showing the comparable port sizes and positions for a constant speed valve rotor as heretofore.

Figure 1:
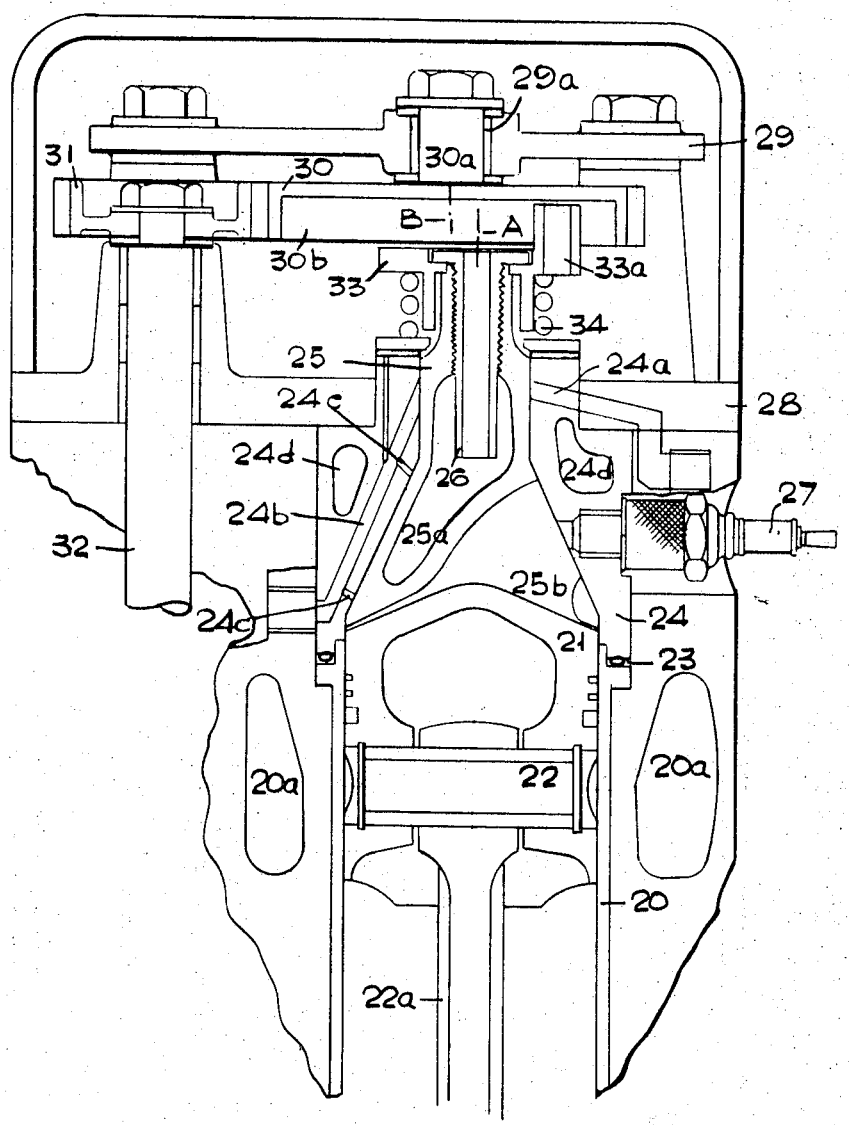
FIG. 1 is a sectional elevation of the cylinder head end of one example of an internal combustion engine of the kind referred to but modified in accordance with the present invention in which the valve rotor makes one complete turn for every two complete turns of the engine crankshaft.

As shown in FIGS. 1 and 2 within the cylinder liner 20 of the engine is a piston 21 attached by a gudgeon pin 22 to a connecting rod 22a. Above the cylinder line 20 and sealed thereto by a sealing ring 23 is a stationary cylinder head 24 within which is rotatably mounted a rotary valve or rotor 25 provided with a nozzle 26 depending into a coolant cavity 25a in the valve. A port 24a is formed in the cylinder head 24 to register periodically with at least one complementary port (not shown) in the upper part of the rotary valve 25. Lubricating oil is fed as the coolant medium down through the nozzle 26 and out through the port 24a for return to the lubrication system of the engine.

A duct 24b and passages 24c leading to the inner conical surface of the cylinder head are provided in the cylinder head to supply lubricant to the complementary conical sealing surfaces of the cylinder head and valve rotor. The cylinder head is formed with a cavity 24d and the cylinder wall is formed with a cavity 20a in which some other coolant medium, such as water, may be circulated in any conventional manner by means of a pump (not shown) driven from the engine. In the valve rotor 25 is a combustion space 25b which, when the piston 21 is in the position shown at top dead center compression, constitutes the major portion of the combustion volume. An ignition plug 27 is shown located in the cylinder head 24 but the inlet and exhaust ports in the cylinder head complementary to the combustion cannot easily be shown in this section without confusing the essential features of the valve and driving means for the valve rotor.

Figure 15:
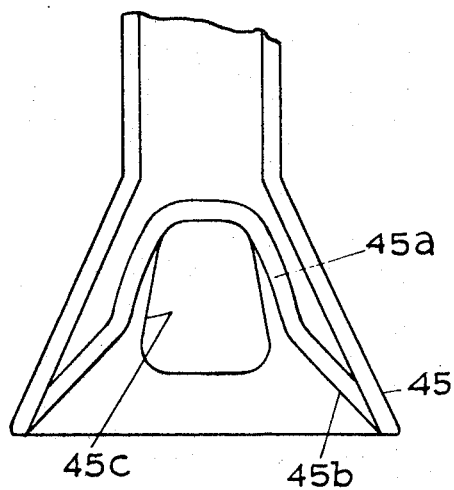
FIG. 15 is a side elevation at right angles to FIG. 14.
Figure 7:
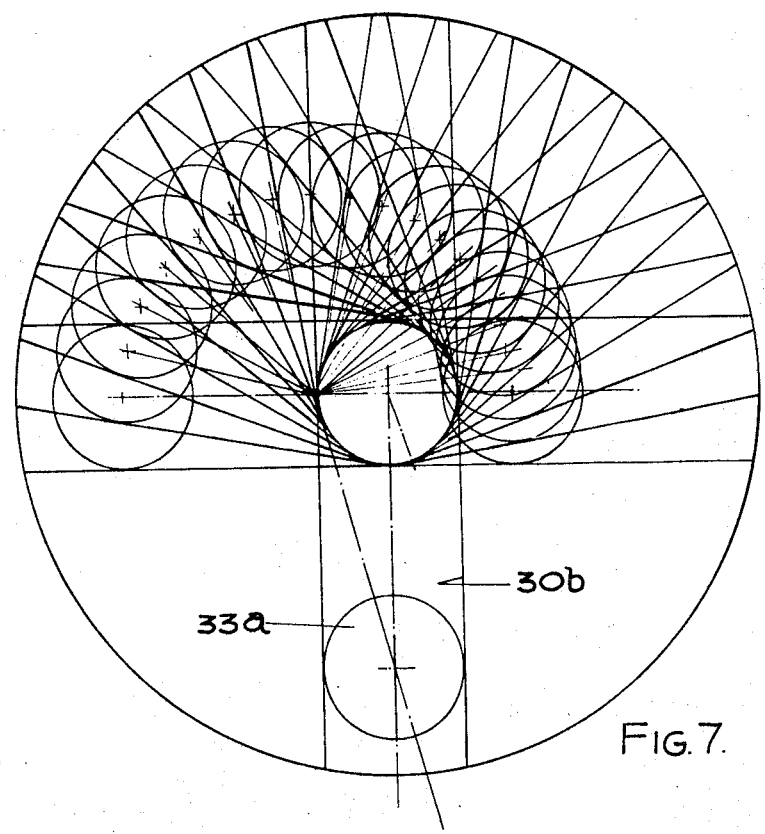
FIG. 7 is a diagram showing the angular movement of the rotor corresponding to 360 degree crank movement corresponding to change of rotor position from that shown in FIG. 3 to that shown in FIG. 5.

On the cylinder head and secured thereto is a platform 28 carrying an upper skeletal platform 29 in which is a bearing 29a for the spindle 30a of a gear pinion 30 in constant mesh with a gear pinion 31 on a driving shaft 32 adapted to be driven at engine speed through gearing (not shown) but conventional for an engine of the kind referred to. The pinions 30 and 31 are dimensioned to turn the rotary valve at half engine speed. In the underside of the pinion 30 is formed a diametrically arranged guide slot 30b while keyed to the upper end of the rotary valve is a crank disc 33 carrying a crank pin 33a engaged with said guide slot 30b. The crank disc is secured in position by the nozzle 26 aforesaid against the head of which it is loaded by a spring 34 which serves to load the rotary valve towards seating engagement in the cylinder head. The relative positions of the axes of rotation of the valve rotor at A and gear pinion 30 at B and the location of the guide slot 30' are shown in FIGS. 2 and 7 as also, by the inclined chain line C dotted line C' is shown the location of maximum and minimum speeds of rotation respectively of the valve rotor respectively at the upper end and the lower end of such dotted line for the positions of the crank pin 33a, the corresponding location of such inclined dotted line being also indicated in FIG. 3. It is of course to be understood that the ports at the conical faces are not circular but will be shaped as described and illustrated in FIG. 15 for the entry to the combustion space 25b.

In operation the angular movement of the valve rotor 25 is shown in FIG. 7 as between top dead center (compression) and bottom dead center for each 20 degree movement of the engine crankshaft starting at FIG. 3 and ending at FIG. 5 with the halfway or 180 degree position (FIG. 4) of the crankshaft (90 degrees of the pinion 30). As can be seen from this FIG. 7 the position of the port 25b for such angle of crank movement varies considerably. Thus for 180 degree movement of the engine crankshaft during gaseous pressure loading of the valve or rotor movement is only 70 degrees, with the slowest movement occurring shortly after combustion. The relative positions of the exhaust port marked EX and of the inlet port marked IN show that the valve port 25b and the exhaust and inlet ports can be larger without overlap (FIG. 5) than is possible with the conventional ports of a conventional constant speed rotor as shown in FIGS. 8 to 11 inclusive with overlap shown in FIG. 10. Thus it can be seen that the port for the combustion space 25b is visibly smaller in FIGS. 8 to 11 than in FIGS. 3 to 6. Also, the port openings for exhaust and inlet cover appreciably larger angles of rotor movement namely 60 degrees for the exhaust and 70 degrees for the inlet and the rotary valve port opening covering 65 degrees of the rotor movement. Moreover, the inlet port opens more quickly from the position of FIG. 5 than it will with the engine of the kind referred to and its port arrangement from FIG. 10 of the drawings. This results in the possibility of larger ports which combined with quicker opening gives more rapid induction of the new charge through the valve and more rapid cooling of the residual gases in the combustion space 25b of the valve rotor 25. The relative positions of the guide slot 30b and crank pin 33a, corresponding to FIGS. 3 to 6 is shown in FIGS. 3A to 6A.

Figure 8:
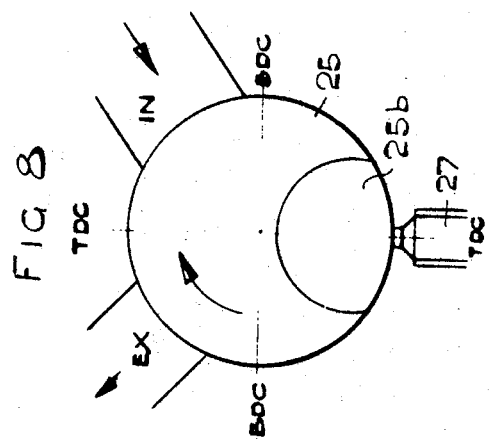
FIGS. 8, 9, 10 and 11 are diagrammatic plan views similar to FIGS. 3, 4, 5 and 6 but showing the comparable port sizes and positions for a constant speed valve rotor of an engine of the kind referred to but not modified according to the present invention.
Figure 9:
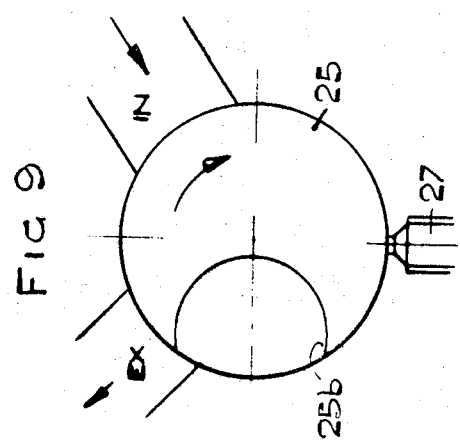
Figure 10:
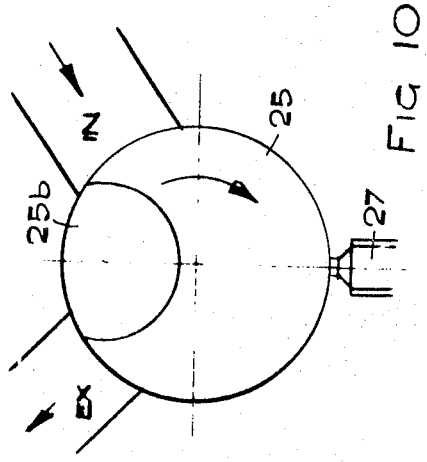
Figure 11:
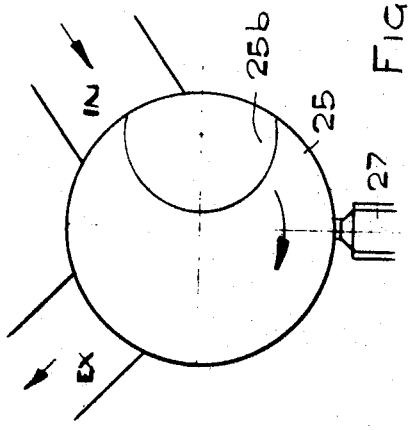

In addition to the aforesaid advantages, easily appreciable by any engineer familiar with the design of an internal combustion engine, the angular rate of movement of the rotary valve and peripheral distance of movement at the conical faces during the period of maximum gaseous pressure (FIG. 3) is about half that in FIG. 8 of the arrangement of any previously known engine of the kind referred to, thus reducing power losses due to mechanical friction and giving an improvement in mechanical efficiency by loss reduction of the order of 13:21.

In the modified construction shown in FIGS. 12 and 13 within the cylinder 40 of the engine is a piston 41 attached by a gudgeon pin 42 to a connecting rod 42a. In the upper end of the cylinder 40 and sealed therein by a ring 43 is a stationary cylinder head 44 within which is rotatably mounted the valve rotor 45 with combustion space 45a. A tube 46 enables lubricating oil from the engine pressure lubricating system to be fed through cooling spaces in the rotor in a manner similar to that shown in FIG. 1. Two inlet passages 47a and 47b are shown as also is the exhaust passage 48. The piston 41 is formed with a frusto-conical crown 41a complementary to a conical recess 45b in the under face of the rotor (see also FIGS. 14 and 15). An ignition plug is not shown in FIG. 12 as it does not appear at this section since the rotor only turns once for every four revolutions of the engine crankshaft. The shape of the port at the face of the rotor is shown at 45c in FIG. 15.

On the cylinder head 44 and secured thereto by bolts 44a is a platform 44b which is a bearing for a gear wheel 49 to be driven at half engine speed through a shaft and complementary pinion not shown. Below the platform is a gear pinion 50 meshing with a gear 51 on the rotor and proportioned 1:2 in size. The gear pinion 50 carries a crank pin 50a which carries a slide 50b slidably engaged with a diametrical guide slot 49a formed in the underside of the gear 49. The axes of the gears 49 and 50 are off-set at 49b and 50b corresponding to the axes B and A of FIG. 1.

As shown in FIGS. 16 to 19 inclusive, the valve rotor 45 is formed with a combustion space 45a providing two diametrically opposite ports 45b in the conical valve face. Driving means, above described, is provided arranged to rotate the rotor once for every four revolutions of the engine, and so that the cyclic speed variations occur twice for every revolution of the rotor. Ignition is provided by means of a single sparking plug 52 (see FIGS. 16 to 19) though a second plug may be provided if desired. As can also be seen from FIGS. 16 to 19 which show only 135 degrees of revolution of the rotor, there are two inlets each marked IN and one exhaust marked EX. For extra high performance a second exhaust may be provided opposite to the one shown but a very high performance will be obtained with only the one exhaust port.

In operation, 4 cycles of the engine will be completed by movement of the rotor 45 through 180 degrees, i.e. from the position shown in FIG. 16, through those shown in FIGS. 17, 18 and 19 back to that of FIG. 16, again, during which one cycle of acceleration and deceleration of the rotor will occur similar to that shown in FIG. 7 with the same advantage as regards reduction of frictional losses at the conical valve faces of the rotor and cylinder head or valve housing as fully explained with reference to FIGS. 1 to 7 and the proportions and timing of the ports for exhaust and inlet and with the added advantage that since the rotor is moving half the speed of that shown in FIGS. 1 to 7 the frictional losses at the conical faces will be substantially halved. The duplication of the inlet ports, (and if provided of the outlet ports) will further increase the induction and scavenging efficiency of the engine as well as balancing the gaseous pressures on the rotor relative to its axis of rotation, with obvious advantage.

The invention is not limited to all the details of construction above described. For instance, elliptical gearing, or other known means than the crank pin and slot mechanism, may be used for providing the desired cyclic acceleration and deceleration of the rotor, and other features of mechanical design may be used than herein described and illustrated without departing from the principle of the invention, which lies basically in the cyclic acceleration and deceleration of the rotor to reduce the rotor speed during the periods of high gaseous pressure on the under or inner face of the rotor causing loading of its conical face. Also, the invention is applicable to the exhaust valve of a 2-stroke engine with comparable advantage, the gas inlet being effected in conventional manner.

I claim:

1. A rotary valve for an internal combustion engine comprising a rotor with means for driving the same continuously, said rotor having a conical sealing face complementary to a conical sealing face in a housing, the base end of the rotor being exposed to gaseous pressure in the cylinder, said rotor being formed with a combustion space open permanently to the cylinder through the said base end of the rotor and to at least one port at the said conical sealing face of the rotor, said combustion space constituting the major portion of the combustion volume at maximum compression and also constituting a passage for combustion gases, said conical sealing face in the housing having at least one inlet and one exhaust port complementary to that in the rotor, means for driving the rotor constructed to provide cyclic variation of rotational speed with phases of increased and reduced speed of rotation characterized in that the phase of reduced speed occurs during combustion pressure axial loading of the rotor, the means for driving the rotor is geared 1:2 to the rotor and a driving member is mounted on a shaft driven at half crankshaft speed, the valve rotor being therefore driven at a mean speed of one quarter engine speed and has a combustion space with diametrically opposed ports at the conical sealing face with complementary ports in the housing, said housing being formed with two inlet ports but only one exhaust port complementary to the diametrically opposed ports in the rotor.

2. A rotary valve for an internal combustion engine comprising a rotor with means for driving the same continuously, said rotor having a conical sealing face complementary to a conical sealing face in a housing, the base end of the rotor being exposed to gaseous pressure in the cylinder, said rotor being formed with a combustion space open permanently to the cylinder through the said base end of the rotor and to at least one port at the said conical sealing face of the rotor, said combustion space constituting the major portion of the combustion volume at maximum compression and also constituting a passage for combustion gases, said conical sealing face in the housing having at least one inlet and one exhaust port complementary to that in the rotor, means for driving the rotor constructed to provide cyclic variation of rotational speed with phases of increased and reduced speed of rotation characterized in that the phase of reduced speed occurs during combustion pressure axial loading of the rotor, and the rotor is set for minimum velocity movmement substantially at the point of maximum cylinder pressure.

3. A rotary valve for an internal combustion engine comprising a rotor with means for driving the same continuously, said rotor having a conical sealing face complementary to a conical sealing face in a housing, the base end of the rotor being exposed to gaseous pressure in the cylinder, said rotor being formed with a combustion space open permanently to the cylinder through the said base end of the rotor and to at least one port at the said conical sealing face of the rotor, said combustion space constituting the major portion of the combustion volume at maximum compression and also constituting a passage for combustion gases, said conical sealing face in the housing having at least one inlet and one exhaust port complementary to that in the rotor, means for driving the rotor constructed to provide cyclic variation of rotational speed with phases of increased and reduced speed of rotation characterized in that the phase of reduced speed occurs during combustion pressure axial loading of the rotor, the means for driving the rotor comprising driving and driven members having their axes of rotation parallel but relatively off-set, one said member having a guide and the other a complementary part engaging the same to provide cyclic phases of relative angular acceleration and deceleration, the driving member being formed with a diametrical guide slot and the driven member carrying a crank pin in complementary sliding engagement with said guide slot, the crank pin being set to cross the common diameter at a point nearest said axes of the driving and driven members substantially at the point of maximum cylinder pressure and to cross an extension of said line at a point farthest from the said axes substantially at the commencement of the inlet cycle.